United States Patent [19]

Haberle et al.

[11] 4,066,286
[45] Jan. 3, 1978

[54] BUMPER FOR MOTOR VEHICLES

[75] Inventors: Fritz Haberle; Daniel Riechers, both of Sindelfingen; Alfred Hochrathner, Boblingen, all of Germany

[73] Assignee: Daimler-Benz Aktiengesellschaft, Germany

[21] Appl. No.: 621,580

[22] Filed: Oct. 10, 1975

[30] Foreign Application Priority Data

Oct. 16, 1974   Germany .............................. 2449240

[51] Int. Cl.² ............................................. B60R 19/08
[52] U.S. Cl. ........................................ 293/87; 293/98; 293/99
[58] Field of Search ...................... 293/70, 87, 98, 99

[56] References Cited

U.S. PATENT DOCUMENTS

| 3,427,063 | 2/1969 | Taylor | 293/98 X |
| 3,815,946 | 6/1974 | Jullig | 293/99 |
| 3,880,455 | 4/1975 | Toemmeraas | 293/99 |

Primary Examiner—Allen N. Knowles
Attorney, Agent, or Firm—Craig & Antonelli

[57] ABSTRACT

A bumper for motor vehicles, especially for passenger motor vehicles which has a U-shaped profile whose web forms the front end of the bumper and which is bearer for guide members guiding the fastening means that are secured at the framework of the vehicle; the guide members are thereby angularly bent spring steel bracket members serving as damping members whose leg portions are fastened at the oppositely disposed legs of the bumper or at the web of the U-shaped profile of the bumper and whose webs are secured at the fastening means.

17 Claims, 8 Drawing Figures

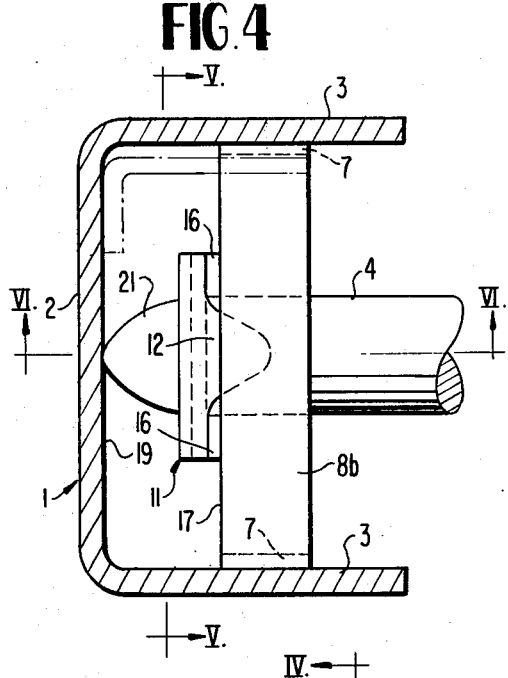
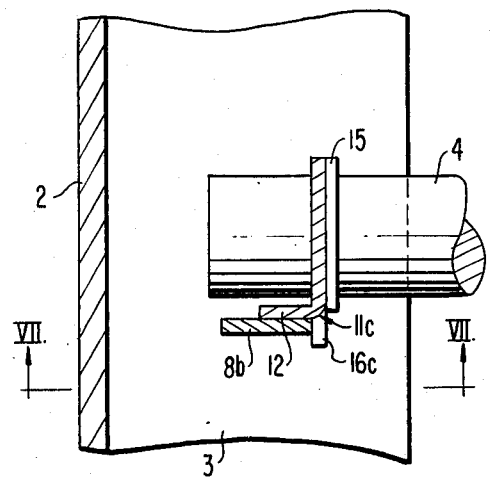
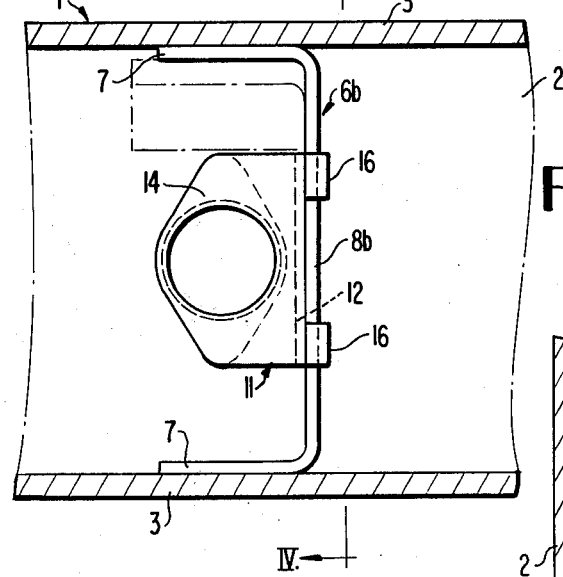
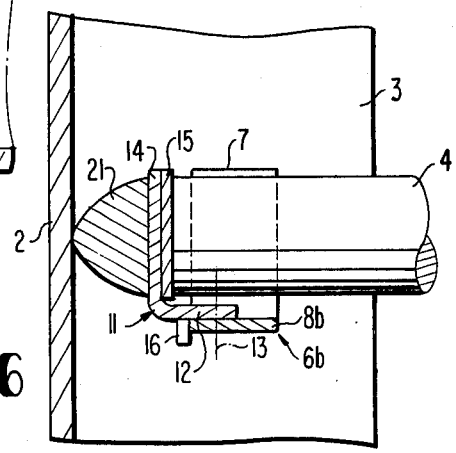

BUMPER FOR MOTOR VEHICLES

The present invention relates to a bumper for motor vehicles, especially for passenger motor vehicles, which has a U-shaped profile whose web forms the front side of the bumper and which is bearer for guide members guiding the fastening means which are fastened at the frame or chassis of the motor vehicle.

In motor vehicles with regenerable bumpers, impact absorber supports are known which under interposition of rubber elements transmit the forces occurring at the bumper onto the impact absorbers. The disadvantage of this support is that they are composed of a relatively large number of individual parts and are therefore costly in manufacture and assembly.

It is the aim of the present invention to construct a regenerable impact-absorber fastening system with few parts, which is effective and is able to dampingly absorb large forces.

The underlying problems are solved according to the present invention in that the guide members are angularly bent spring steel bracket members serving as dampening members, whose leg portions are secured at the mutually oppositely disposed legs or at the web of the U-shaped profile member of the bumper and whose webs are secured at the fastening means. These fastening means may be constructed as impact absorbers or as shock absorbers of any conventional known type.

According to one embodiment of the present invention, respectively two spring steel bracket members may be provided abutting at one another with the outer sides of their webs outside of the area of the fastening means and, within the area of the fastening means, surrounding the same. Beads may thereby be arranged on the fastening means on both sides of the spring steel bracket, which assure the force-locking connection between the spring steel brackets and the fastening means. Additionally, the webs of the spring steel brackets members may thereby be connected at one another by means of rivets or bolts or screws and the legs of the spring steel bracket members may be secured at the legs of the bumper by means of rivets or bolts or screws.

However, the spring steel bracket members may also be arranged only on one side of the fastening means. This construction is then such that one angle member which is secured with one leg in its center at a spring steel bracket member and with one leg at a receiving or mounting flange seated on the fastening means, is provided eccentrically with two lugs, by means of which it is supported at an edge of the spring steel bracket member. The edge, at which the lugs of the angle member are supported, may either face the web of the U-shaped profile member of the bumper or may be disposed opposite therefrom. In the former case it is advantageous if an elastically yielding buffer made from an elastomer is arranged at the end of the fastening means facing the web of the U-profile of the bumper between the angle member and the inner walls of the web of the U-shaped profile member of the bumper.

In both cases, the angle member is advantageously secured in its center at the spring steel bracket member by means of a screw, bolt or rivet and the leg portions of the spring steel bracket member are secured at the legs of the bumper by means of rivets, screws, bolts or by welding.

In the latter case, higher damping forces can be transmitted by way of the connection of the angle member with the spring steel bracket member. An elastically yielding buffer may then even be dispensed with in that case. The receiving flange is therefore located in that case on the side of the spring steel bracket member opposite the bumper, and the lugs of the angle member engage at the edge of the spring steel bracket member which is located away from the web of the U-shaped profile of the bumper. It is achieved by this arrangement that the lugs not only prevent the tilting of the fastening means but establish a force-locking connection and therewith relieve the connection of the angle member with the spring steel bracket member.

Accordingly, it is an object of the present invention to provide a bumper for motor vehicles, especially for passenger motor vehicles which avoids by simple means the aforementioned shortcomings and drawbacks encountered in the prior art.

Another object of the present invention resides in a regenerable bumper for motor vehicles which is relatively simple in construction and involves only relatively few individual parts.

A further object of the present invention resides in a bumper for motor vehicles which is relatively inexpensive in manufacture and assembly.

A still further object of the present invention resides in a regenerable bumper with an impact-absorber fastening that is effective and is able to dampingly absorb large forces.

These and other objects, features and advantages of the present invention will become more apparent from the following description when taken in connection with the accompanying drawing which shows, for purposes of illustration only, several embodiments in accordance with the present invention, and wherein:

FIG. 4 is a cross-sectional view, taken along line IV—IV of FIG. 5 of another embodiment of a bumper in accordance with the present invention, illustrating another type of connection including an elastically yielding buffer;

FIG. 5 is a cross-sectional view, taken along line V—V of FIG. 4, with the fastening means and elastic bumper omitted for the sake of clarity;

FIG. 6 is a cross-sectional a view, taken along line VI—VI of FIG. 4;

FIG. 8 is a cross-sectional view, taken along line VIII—VIII of FIG. 7.

Figure 1:
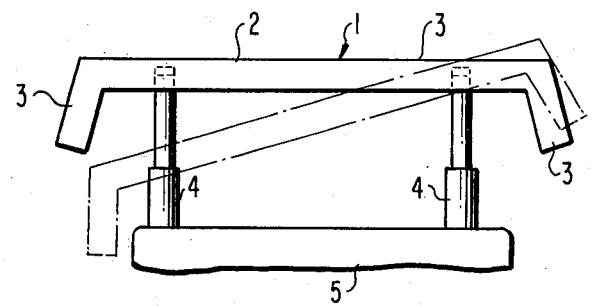
FIG. 1 is a schematic plan view on a bumper in accordance with the present invention.

Referring now to the drawing wherein like reference numerals are used throughout the various views to designate like parts, and more particularly to FIG. 1, this figure illustrates a bumper generally designated by reference numeral 1 which consists of a U-shaped profile member having a web 2 and two legs 3. The bumper 1 is secured at the chassis or framework 5 of the motor vehicle by fastening means 4. The fastening means are thereby constructed as shock absorbers of any known type or the like.

The web 2 of the U-shaped profile of the bumper 1 forms the front side of the bumper whereas the legs 3 are the bearers or supports of the fastening means 4 by means of guide elements 6. These guide elements, however, may also be fastened only partly at the leg portion 3 and partly at the web 2 or completely at the web 2, depending on the construction of the bumper. The guide members 6 are formed by angularly bent spring steel bracket members which serve as damping members and whose leg portions 7 are secured at the oppositely disposed legs 3 or at the web 2 of the U-shaped profile member of the bumper 1. The webs 8 of the spring steel bracket members 6 are mounted directly or indirectly at the fastening means 4.

Figure 2:
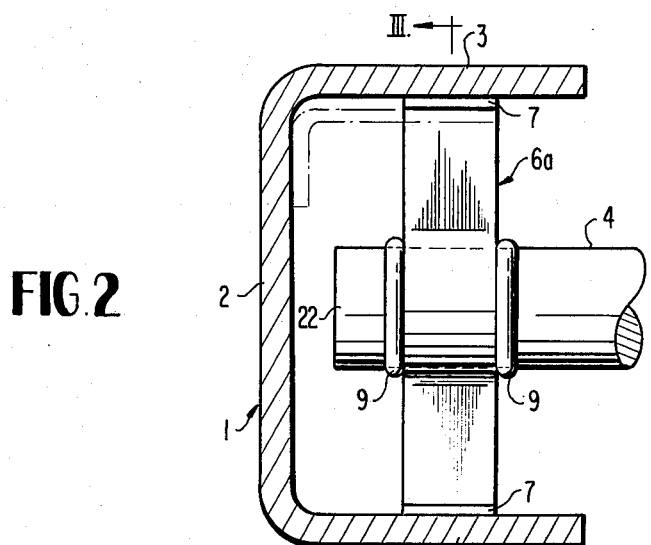
FIG. 2 is a cross-sectional view, taken along line II—II of FIG. 3, of one embodiment of a bumper in accordance with the present invention illustrating one type of the elastic connection of the fastening means, also constructed as impact absorbers, with the bumper.
Figure 3:
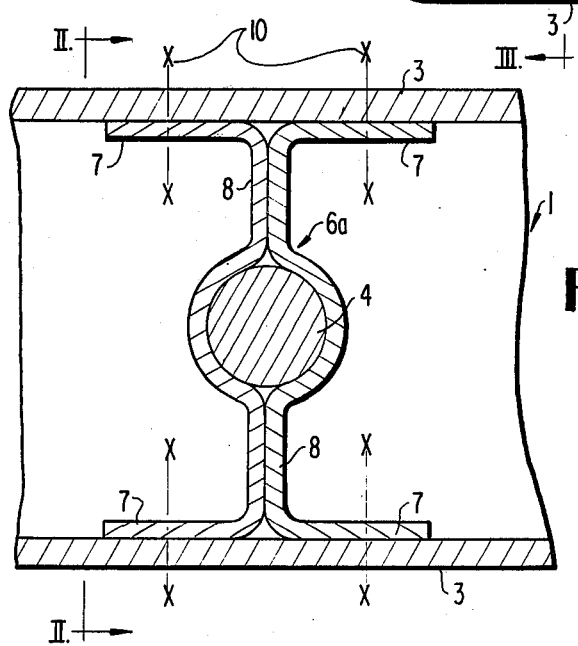
FIG. 3 is a cross-sectional view taken along line III—III of FIG. 2.

In the embodiment according to FIGS. 2 and 3, two U-shaped spring steel bracket members generally designated by reference numeral 6a are threadably secured or riveted together, abutting at one another with the outer sides of their webs 8 outside of the area of the fastening means 4. Within the area of the fastening means 4, the webs 8 of the guide members 6a are matched to the outer diameter of the fastening means 4 and surround the same. Beads 9 are arranged on the fastening means 4 on both sides of the spring steel bracket members 6a which assure the force locking connection between the spring steel bracket members 6 and the fastening means 4 in the axial direction. The spring steel bracket members 6 are secured with the leg portions 7 thereof by means of screws or bolts 10 at the legs 3 of the U-shaped profile member 1.

As is illustrated in FIGS. 2, 4, and 5 in dash and dot lines, at least one leg portion 7 of the spring steel bracket member 6a may also be angularly bent in such a manner that it can be fastened at the web 2 of the U-shaped profile member of the bumper 1.

According to the embodiments illustrated in FIGS. 4 to 8, one leg portion 12 of an angle member generally designated by reference numeral 11 is threadably connected in its center by means of a single bolt or rivet 13 (FIG. 6) at the web 8b of the spring steel bracket member 6b. The angle member 11 abuts with its other leg portion 14 at a mounting or receiving flange 15 provided at the fastening means 4 and is threadably secured thereat with the same by means of two bolts, only schematically indicated in FIGS. 4 and 7. Additionally, the angle member 6 is provided with two lugs 16, by means of which it is supported at the edge 17 of the spring steel bracket member 6b adjacent the web 2 of the U-shaped profile 1 in the case of the embodiment illustrated in FIGS. 4 to 6.

Figure 7:
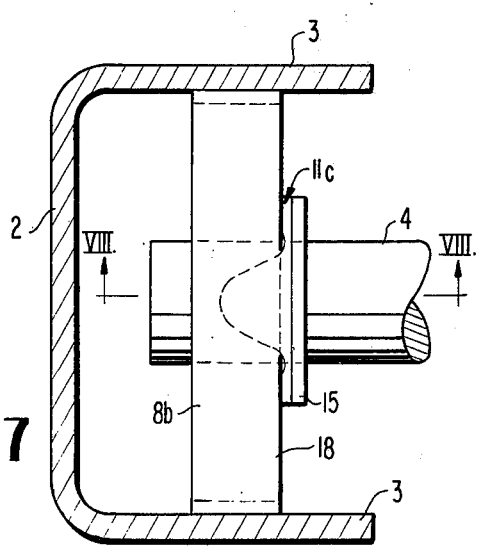
FIG. 7 is a cross-sectional view, similar to FIG. 4, of a still further modified embodiment of a bumper in accordance with the present invention, taken along line VII—VII of FIG. 8.

In the embodiment illustrated in FIGS. 7 and 8, the angle member generally designated by reference numeral 11c is rotated so that the lugs 16c of this angle member 11c are supported at the edge 18 opposite the web 2 of the U-shaped profile member of the bumper 1.

In the embodiment illustrated in FIGS. 4 to 6, an elastically yielding buffer 21 of an elastomer material of suitable, known type is arranged at the end of the fastening means 4 facing the web 2 of the U-shaped profile member of the bumper 1 between the angle member 11 and the inner wall surface 19 of the web 2 of the U-shaped profile member of the bumper 1.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A bumper for motor vehicles, which comprises a U-shaped profile means having a web and legs, the web forming the front side of the bumper and constituting a support for guide members operable to guide fastening means that are secured at a relatively fixed part of the vehicle, characterized in that the guide members are angularly bent spring steel bracket means serving as damping means which include leg portions and web portions, the leg portions being secured at the bumper and the web portions at the fastening means and wherein two U-shaped spring steel bracket means each are provided which abut at one another with the outer sides of their web portions outside of the area of the fastening means and which surround the fastening means within the area of the latter.

2. A bumper according to claim 1, characterized in that bead means are arranged on the fastening means on both sides of the spring steel bracket means which assure the force-locking connection between the spring steel bracket means and the fastening means.

3. A bumper for motor vehicles, which comprises a U-shaped profile means having a web and legs, the web forming the front side of the bumper and constituting a support for guide members operable to guide fastening means that are secured at a relatively fixed part of the vehicle, characterized in that the guide members are angularly bent spring steel bracket means serving as damping means which include leg portions and web portions, the leg portions being secured at the bumper and the web portions at the fastening means and wherein the web portions of the spring steel bracket means are secured at one another and the leg portions thereof are secured at the legs of the bumper.

4. A bumper for motor vehicles, which comprises a U-shaped profile means having a web and legs, the web forming the front side of the bumper and constituting a support for guide members operable to guide fastening means that are secured at a relatively fixed part of the vehicle, characterized in that the guide members are angularly bent spring steel bracket means serving as damping means which include leg portions and web portions, the leg portions being secured at the bumper and the web portions at the fastening means and wherein an angle member is secured with one leg portion thereof approximately in its center at one spring steel bracket means and with its other leg portion at a mounting flange seated on the fastening means, said angle member being provided eccentrically with two lug means, by means of which said angle member is supported at one edge of the spring steel bracket means.

5. A bumper according to claim 4, characterized in that the edge at which the lug means are supported, faces the web of the U-shaped profile means of the bumper.

6. A bumper according to claim 4, characterized in that the angle member is secured at the spring steel bracket means by threaded means.

7. A bumper according to claim 4, characterized in that the angle member is secured at the spring steel bracket means by rivet means.

8. A bumper according to claim 4, characterized in that the leg portions of the spring steel bracket means are fastened at the legs of the bumper by rivets.

9. A bumper according to claim 4, characterized in that the leg portions of the spring steel bracket means are fastened at the legs of the bumper by threaded means.

10. A bumper according to claim 4, characterised in that the leg portions of the spring steel bracket means are fastened at the legs of the bumper by welding.

11. A bumper according to claim 4, characterised in that the edge, at which are supported the lug means of the angle member, is located away from the web of the U-shaped profile means.

12. A bumper for motor vehicles, which comprises a U-shaped profile means having a web and legs, the web forming the front side of the bumper and constituting a support for guide members operable to guide fastening means that are secured at a relatively fixed part of the vehicle, characterized in that the guide members are angularly bent spring steel bracket means serving as damping means which include leg portions and web portions, the leg portions being secured at the bumper and the web portions at the fastening means and wherein an elastically yielding buffer means of an elastomer material is arranged intermediate the fastening means and the inner wall surface of the web of the U-shaped profile means.

13. A bumper according to claim 12, characterized in that the buffer means is arranged between the end of the fastening means and the inner wall surface of the web of the U-shaped profile means.

14. A bumper according to claim 12, characterized by an angle member secured with one leg portion thereof approximately in its center at one spring steel bracket means and with its other leg portion at a mounting flange seated on the fastening means, said angle member being provided eccentrically with two lug means, by means of which said angle member is supported at one edge of the spring steel bracket means.

15. A bumper according to claim 14, characterized in that the buffer means is arranged between the angle member and the inner wall surface of the web.

16. A bumper according to claim 12, characterized in that the buffer means is arranged at the web of the U-shaped profile means.

17. A bumper according to claim 12, characterized in that the buffer means is arranged at the end of the fastening means facing the web of the U-shaped profile means.

* * * * *